Feb. 10, 1942.     F. P. FORSS     2,272,295
PORTABLE NIBBLING TOOL
Filed Aug. 3, 1940     2 Sheets-Sheet 1
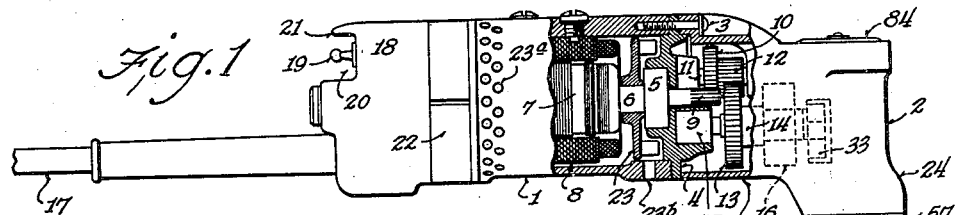
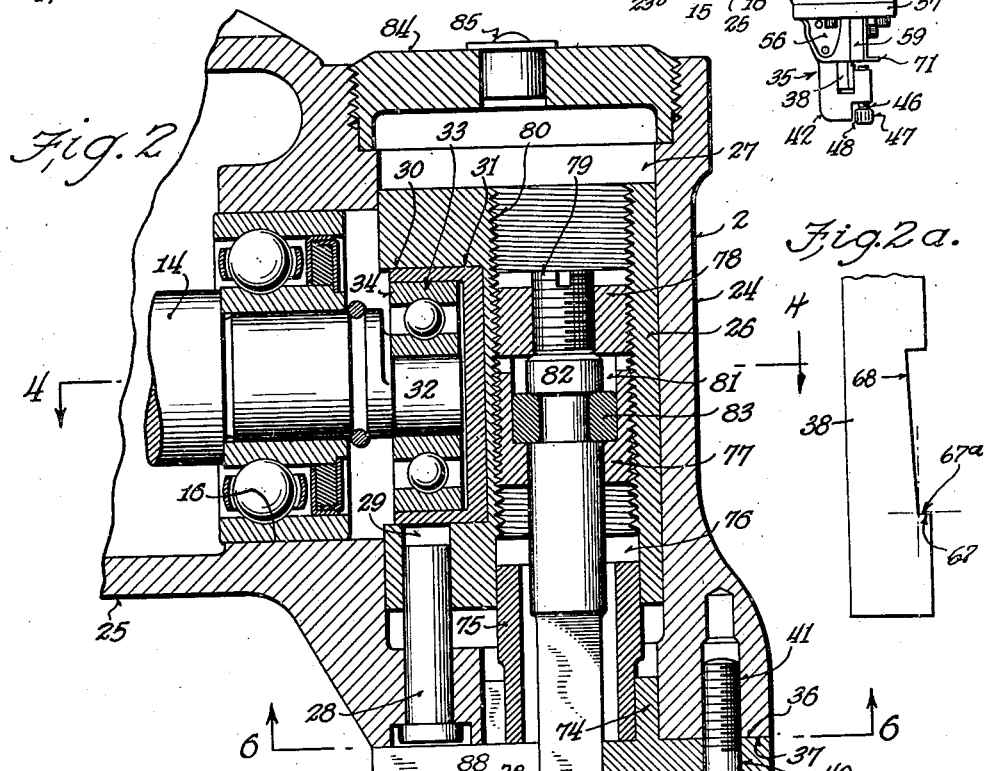
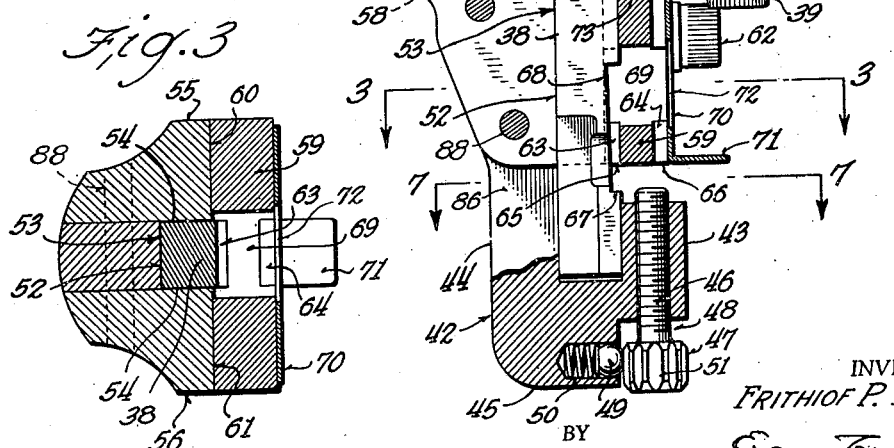
INVENTOR.
FRITHIOF P. FORSS
BY
ATTORNEY.

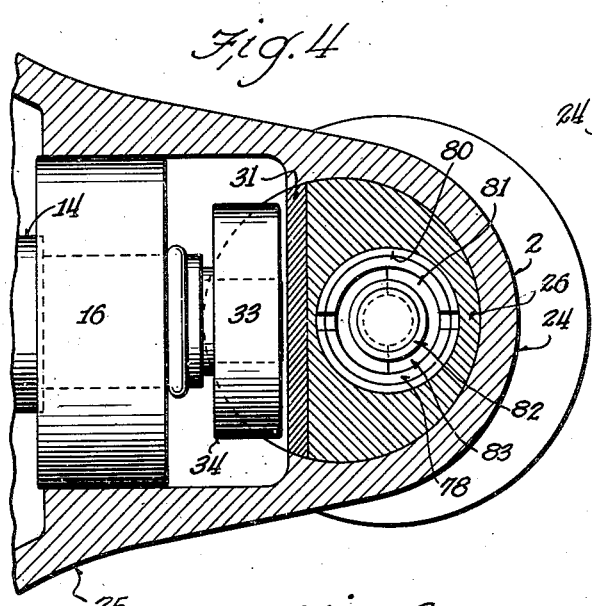
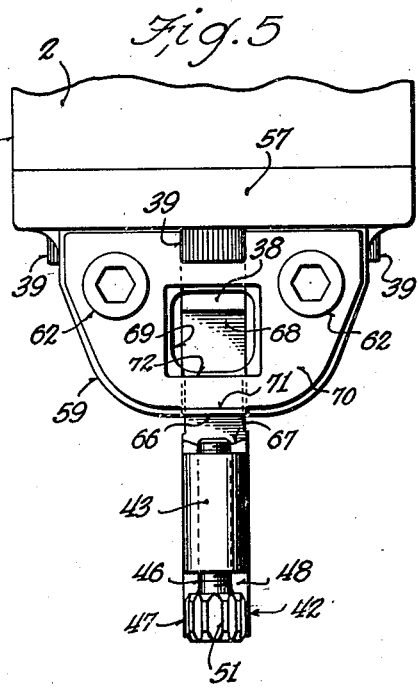
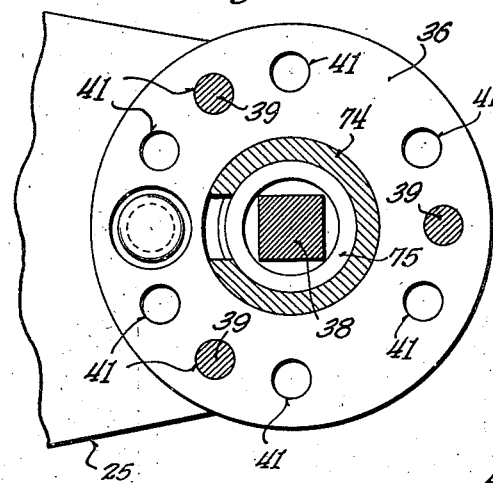
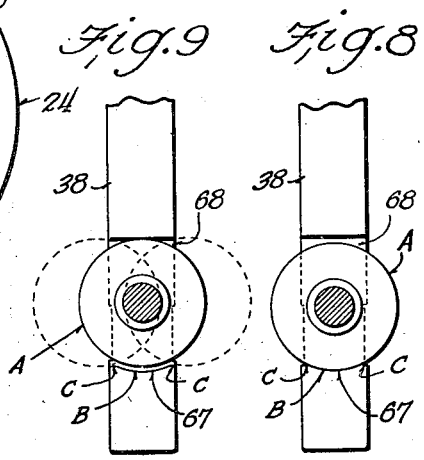
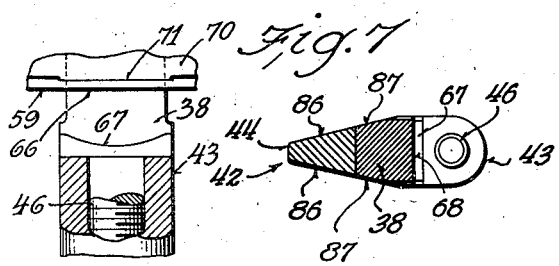

Patented Feb. 10, 1942

2,272,295

UNITED STATES PATENT OFFICE 2,272,295

PORTABLE NIBBLING TOOL

Frithiof P. Forss, Aurora, Ill., assignor to Independent Pneumatic Tool Company, Chicago, Ill., a corporation of Delaware Application August 3, 1940, Serial No. 350,665

17 Claims. (Cl. 164—47)

This invention relates to improvements in portable motor driven nibbling tools of the type disclosed in the prior patent to Herbert L. Trautmann, No. 2,201,599, granted May 21, 1940.

Among the objects of my invention are the following:

To so construct and mount the nibbling head on the tool body that the entire nibbling head assembly including the cutting plunger, its cooperating fixed cutting blade, work support and stripper may be angularly adjusted simultaneously about the axis of the cutting plunger;

To provide for the rotative adjustment aforesaid by the provision of a series of circumferentially arranged tapped holes in the tool body to accommodate the screws which clamp the nibbler head in place;

To cover the front side of the guide opening in the nibbler head for the reciprocating cutting plunger with a releasable plate which provides a pair of cutting edges, either of which may be used on reversing the plate;

To provide the cutting plunger with a cutting edge extending crosswise of the plunger and having connected cutting portions, one being arcuate and the other substantially straight to give the plunger a shearing action at the arcuate portion and a punching action at the straight portion;

To provide the stationary cutting plate with a discharge opening for the cuttings removed by the tool;

To provide a shield for the cutting plate and employ a fixed forwardly projecting flange on the shield plate as a guide on the tool whereby the operator may readily and easily follow a pattern line on the metal work sheet being cut;

To provide the goose-neck work support with a recess at its lower end to accommodate the headed end of the adjustable stripper whereby the screw head does not project materially beyond the limits of the tool;

To provide the goose-neck with a spring biased detent for cooperation with the stops or notches on the head of the adjustable stripper screw to hold the same against accidental turning;

To provide the eccentric drive for the cutting plunger in the body portion of the tool above the nibbler head and to incorporate in the construction a key arrangement for holding the driving ram against rotation;

To provide the upper end of the cylinder for the ram with a chamber equipped with an oiling fixture whereby the ram may be lubricated for reciprocation within said cylinder;

To provide an adjustable connection for the cutting plunger with the ram whereby the plunger may be adjusted axially to compensate for re-sharpening of its cutting edge; and To provide a screw threaded connecting plug and clamp assembly within the ram to hold the cutting plunger in position and also to provide a swivel connection between the cutting plunger and the ram for angular adjustment of the former about its longitudinal axis.

The invention consists further in the features hereinafter described and claimed.

In the accompanying drawings—

Fig. 1 is a side elevational view, on a small scale, of a portable electrically motor driven nibbling tool constructed in accordance with my invention, a portion of the outer casing of the tool broken away to show the driving connection between the electric motor and the driving shaft for the eccentric;

Fig. 2a is a side view of the cutting plunger on an enlarged scale to show the backward slope at its cutting edge to be hereinafter referred to;

Fig. 2 is a vertical sectional view, on an enlarged scale with parts in elevation, of the connected tool body and nibbler head assembly at the front end of the tool;

Fig. 3 is a horizontal sectional view taken on line 3—3 of Fig. 2;

Fig. 4 is a horizontal sectional view taken on line 4—4 of Fig. 2, but showing the ball-race cages in full plan;

Fig. 5 is a front elevational view of the nibbler head and the adjacent portion of the tool body;

Fig. 6 is a horizontal sectional view taken on line 6—6 of Fig. 2;

Fig. 7 is a horizontal sectional view taken on line 7—7 of Fig. 2;

Figs. 8 and 9 are front elevational views indicating the grinding method for producing the cutting edge on the reciprocable cutting plunger to be hereinafter described; and Fig. 10 shows the curvature of the cutting edge of the cutting plunger and the surrounding tool structure on a larger scale and to a better advantage than the showing made in Fig. 5, the parts in Fig. 10 being broken away and in section and elevation, respectively, for the purpose of illustration.

As illustrated in Fig. 1, the complete tool comprises alined motor and body sections 1 and 2, respectively, connected in end to end relation by fastening screws, one of which is shown at 3. These sections are closed in respect to each other by an interposed center plate 4. This plate provides a support on one side for a ball bearing 5 for the shaft 6 of the armature 7 of the electric motor 8 located within the motor casing 1. The shaft 6 extends through the plate 4 and is provided at its forward end with gear teeth 9 which mesh with a gear wheel 10 fixed to a counter shaft 11 journaled at one end in the plate 4 and at the other end in the tool body 2. Also fixed to the shaft 11 is a gear pinion 12 which meshes with a gear wheel 13 fixed to a shaft 14 which drives the eccentric to be presently described.

The shaft 14 is journaled at its opposite ends in the plate 4 and the tool body 2, respectively. As shown in Fig. 1, the ball bearings for these shafts are indicated at 15 and 16, respectively.

The electric supply cable for the motor 8 is shown at 17 in Fig. 1. This cable connects with the motor through a switch housing 18 at the rear end of the motor case 1. The actuating lever 19 for the switch is on the rear side of the housing 18 in a recess 20. The upper portion of this recess is formed by a projecting flange or guard 21 cast integral with the switch housing as shown.

The brushes (not shown) for the motor 8 are located within the motor case 1 adjacent to the switch housing 18. The spring clip for closing the openings in the motor case for the brushes is indicated at 22. The motor 8 is cooled by an air circulating fan 23 fixed to the shaft 6. The motor case is provided with air intake openings 23a for the fan at the rear end of the motor and air discharge openings 23b at the fan as shown.

The body portion 2 is at the front end of the tool and comprises front and rear sections 24, 25 preferably cast integral with each other and disposed with the front section in right angular relation to the rear section and extending to at least one side thereof as shown in Figs. 1 and 2. The rear section 25 is cored out to provide an enclosing chamber for the gear drive and the shafts 6 and 14 as shown in Fig. 1. This gear drive is also a reducing gear whereby the eccentric to be presently described will be operated at a considerably slower speed than that developed by the motor 8. The body section 24 mounts a reciprocable ram 26 in a cylindrical chamber 27 disposed in crossing relation to the shaft 14 and made to open through the upper and the lower ends of the body section as shown in Fig. 2. The ram 26 is guided and held from rotation within the chamber 27 by a pin 28 mounted in a fixed position in the tool body 2 and extending into a bore 29 within the ram as detailed in Fig. 2. The pin 28 is preferably headed at its outer end and is held from displacement by having a reasonably tight fit within the tool body.

The eccentric drive for the ram 26 comprises a cross-slot 30 in the ram intermediate its upper and lower ends as detailed in Fig. 2. A channel-shaped wear resisting bushing 31 is fitted in the slot 30 and receives the eccentric projection 32 at the forward end of the shaft 14. A ball bearing assembly 33 is mounted on the eccentric projection 32 and has its outer ring 34 in peripherical contact with the top and bottom walls of the bushing 31 to impart the upward and downward movement of the eccentric to the ram.

The nibbler head marked generally 35 in the drawings is secured to the lower end of the body section 24 below the ram 26 as illustrated in Fig. 2. The lower surface 36 of the body section 24 is flat and provides a seat for the flat upper surface 37 of the nibbling head. The cutting plunger 38 to be presently described extends out of the tool body 24 and into the nibbler head 35 across and at the center of the plane of the surfaces 36, 37 when the parts are in assembled relation as detailed in Fig. 2. This locates the inner or upper portion of the cutting plunger 38 within the tool body, while its outer or lower portion is within and embraced by the nibbler head 35. The upper portion of the cutting plunger 38 is connected with the ram 26 for reciprocation thereby. The plunger has a swivel connection with the ram so that the plunger may be turned about its longitudinal axis for the purpose to be presently referred to.

The nibbler head 35 is secured to the tool body 24 by a number of screws 39 extending through untapped openings 40 in the nibbler head and screwed into tapped openings 41 in the tool body as detailed in Fig. 2. In the embodiment shown (see Fig. 6) three of these fastening elements 39 are employed to secure the nibbler head to the tool body, said fasteners being equally spaced circumferentially about the axis of the cutting plunger 38. The tapped openings 41 in the body section 24 are similarly spaced about the axis of the plunger 38, but being in excess in number in respect to the fasteners 39 provide for rotative adjustment of the nibbler head about the axis of the plunger. The adjustment is not automatic, in that, it is necessary to first remove the fasteners 39 from the body section 24 and then turn the nibbler head until the fasteners may enter the selected set of openings 41 in the tool body 25 for the adjustment desired, whereupon, the fasteners are screwed into place to secure the nibbler head in its position of rotative adjustment. This adjustment is made only when the condition or lay of the work requires the cutting to be made at an angle to the length of the motor section 1 which also forms the handle of the tool. For example, the adjustment would be made to cut along a line at an angle to another when due to the obstruction afforded by the work or otherwise the motor section 1 could not be retained in alinement with the line of the intended cutting. The cutting plunger 38 is turned in unison with the nibbler head when rotatably adjusting the same due to the swivel connection of the plunger with the ram and its non-rotative connection with the nibbler head as will presently appear.

In the embodiment shown, the tapped openings 41 are arranged to provide for a rotative adjustment of 30, 90 or 120 degrees, respectively, on either side of the normal position of the head 35 for a forward cutting in line with the axis of the motor section 1.

The nibbler head 35 comprises a goose-neck work support 42 made of tool steel and having vertically extending spaced front and rear portions 43, 44 and a lower connected cross-portion 45. The front portion 43 carries a vertically disposed screw 46, the head 47 of which is located within a recess 48 within the work support and located at its lower end. The head 47 of the screw 46 is retained within the recess 48 in practically all positions of axial adjustment of the screw 46 and, hence, the head of the screw does not materially project below the lower end of the goose-neck 42 in any position of its adjustment. This protects the head of the screw from injury in the handling of the tool.

The cross-portion 45 of the goose-neck carries a spring biased detent ball 49 in a recess 50 to cooperate with a series of notches 51 in the screw head 47 for holding the screw against accidental turning in any position of its adjustment. These notches 51 extend longitudinally of the screw so as to retain connection with the detent in the adjustment of the screw.

The rear section 44 of the goose-neck 42 extends to the upper surface 37 of the nibbler head and forms the rear wall 52 of a bore or guideway 53 for the lower portion of the cutting plunger 38 at the nibbler head. The side walls 54, 54 of the guide-way 53 are provided by side sections 55, 56 of the nibbler head below the upper surface 37 as shown in Fig. 3. These side members 55, 56 are preferably integral with a top section 57 of the nibbler head and which top section 57 is continuous about the nibbler head, except at its radial slot 58 for accommodating the upright rear member 44 of the goose-neck element as detailed in Fig. 2. As illustrated in Fig. 3, it will be observed that the guide-way 53 for the cutting plunger 38 is rectangular in cross-section and that the section of the plunger within the nibbler head 35 is similarly shaped to fit within said guide-way. This construction, while it allows for reciprocation of the plunger 38 with the ram 26, holds the plunger against axial rotation. Hence, the plunger may be adjusted rotarily simultaneously with the goose-neck 42 on turning the nibbler head 35 about the axis of the cutting plunger. The openings 40 for the fasteners 39 extend through the upper annular section 37 of the nibbler head as shown in Fig. 2.

The front side of the guide-way 53 is closed by a stationary cutting blade 59. This blade is in the form of a plate conforming to the contour of the side members 55, 56 and is secured to the flat front surfaces 60, 61 thereof by a pair of fastening screws 62, 62. These screws extend through untapped openings in the stationary cutting blade 59 and engage threaded openings (not shown) in the respective side members 55, 56. The plate 59 is provided on each side with a milled channel-way 63, 64, said channel-way being similar and in keeping with the width of the guide-ways 53 as shown in Fig. 3. Hence, the plate 59 when in place in the nibbler head assembly provides the front wall of the guide-way 53 regardless of which side of the plate 59 is secured to the side members 55, 56. The advantage of this is that the plate 59 being reversible enables either of its cutting edges 65, 66 to be used. One of these cutting edges is at the lower end of each channel-way 63, 64. Hence, when the plate is secured to the side members 55, 56 with the channel 63 completing the front side of the guide-way 53, the cutting edge 65 of the plate faces the plunger 38 for co-action with its cutting edge 67 as shown in Fig. 2. Conversely, when the plate 59 is reversed, the cutting edge 66 of the plate 59 faces the plunger 38 and coacts with its cutting edge 67.

It will be observed from Fig. 2 that the forward or outer end of the cutting plunger 38 extends into the space between the front and rear sections 43, 44 of the goose-neck 42 beyond the plate 59 and is supported and guided by the said sections. The cutting edge 67 of the plunger 38 is on its front side at a point rearward from the outer end of the plunger so that the cutting edge 67 may coact with the cooperating cutting edge on the fixed cutting plate 59 without the forward end of the plunger leaving the guide-way between the front and rear sections of the goose-neck. Hence, the plunger 38 is amply supported against vibration or pressure of the work at its outer end, being similarly supported at the cutting plate 59 by the walls of the guide-way 53 in the nibbler head construction. The plunger 38 is provided with a relief section 68 inwardly of its cutting edge 67 so as to provide a feed limit for the sheet metal being cut by the device. This relief section 68 is long enough to register with an opening 69 in the cutting plate 59 so that the cuttings removed from the material being operated on by the cutting edges 65, 67 may find exit from the tool. Said relief section 68 is preferably inclined as shown so that the cuttings will pass up more readily into the space 69 to be ejected by gravity later. The lower front edge of the stock strikes 68 and 67 cuts vertically so that, since 68 slopes backwardly from the edge of the stock being cut, the cutting is of less width than the space between 68 and 59. It is to be understood that when the tool is operating in the position shown in the drawings, the nibbler head 35 extends below the motor casing 1 and the plunger 38 operates to cut the sheet on an up-stroke.

A relatively thin in sectional depth, but rigid sheet metal plate 70 is disposed over the front side of the cutting plate 59 and is held in place thereon by the screws 62. This plate 70 conforms to the contour of the plate 59 and is provided at its lower edge with a forwardly extending, horizontally disposed, projection 71. This projection 71 is centrally disposed in respect to the plunger 38 and hence, being in line with the plunger and extending forwardly serves as a guide for the operator in following a pattern line on the sheet material being cut by the tool. The plate 70 is provided above the projection 71 with an opening 72 commensurate and registering with the opening 69 in the cutting plate to permit the cuttings to be discharged from the front side of the tool. The projection 71 is of considerable width as shown in Fig. 3 to deflect the ejected cuttings to each side of the line being cut by the tool. Hence, the projection 71 not only serves as a line pointer for the tool, but as a guard against the cuttings falling back on the line being cut to be needlessly cut again.

As clearly shown in the drawings, the upper section 57 of the nibbler head overhangs or extends beyond the front surfaces 60, 61 of the side members 55, 56 and thus provides in conjunction with said side members a recess to accommodate the cutter plate 59 and its covering plate 70. The upper edge 73 of the plate 59 is preferably straight and fits against the opposed under surface of the member 57 as shown in Fig. 2. In this way the plate 59 is amply supported in place against end thrusts thereon in the cutting operation of the tool.

The work receiving mouth opening for the nibbler head is comprised by the space between the upright front section 43 of the goose-neck 42 and the lower end of the cutter plate 59. The relief section 68 in the plunger 38 faces this throat and thus enables the material being operated on to be fed into position to be severed by the cutting edges 65, 67. The extent of the feed is determined by the depth of the relief section 68 as well understood in this art. The adjusting screw 46 has its upper end extendible into this throat portion to support and strip the sheet material from the plunger in the operation of the tool. The screw 46 may be adjusted to provide the feed clearance allowable at the throat for the gauge of sheet material being operated upon.

The nibbler head 35 is provided with an upstanding bushing 74 above its head section 57 to fit within the lower end of the ram chamber 27 as shown in Fig. 2. This bushing guides and centers the nibbler head with respect to said cylinder. The bushing is cut away at the slot 58 to register therewith and allow the rear section 44 of the goose-neck 42 to continue to the upper surface of the head section 57 as shown in Fig. 2. The nibbler head has a second bushing 75 which has a tight fit in the first bushing 74 and extends above the same for entering into the lower end of a cylindric bore 76 in the ram 26. The bushing 75 does not interfere, with the turning of the upper portion at its swivel connection with the ram as shown.

The plunger 38 is secured to the ram 26 within the bore 76 by two externally threaded members 77, 78 and a set screw 79. The first two members are in the form of screw plugs which engage internal threads 80 within the ram bore. The lower plug 77 carries the plunger 38 and has a recess 81 to receive the headed end 82 of the plunger and the divided retainer 83. The latter comprises two halves so that it may be applied about the neck portion of the plunger below its head section as shown. The retainer 83 seats against the bottom wall of the recess 81 and holds the plunger 38 against downward displacement when in the ram 26. The upper plug 78 screws down close to the plunger head 82 and holds the plunger from upward displacement. The set screw 79 engages against the plunger head to complete the setting for the plunger with just enough clearance for turning the plunger when said plunger is adjusted angularly with respect to the nibbler head. Screwing the plugs up or down the bore of the ram enables the plunger to be adjusted in respect to the cutting edge on the cutter plate 59. This is done when first assembling the tool at the factory and afterward when re-sharpening the cutting edge 67.

With the ram bore open at its upper end, the screw plugs and the set screw just described may be readily and easily reached for turning with the proper tool. The upper ends of the plug 78 and the set screw 79 are slotted or kerfed, while the lower plug is slotted at its recess 81 for a spanner.

The upper end of the cylinder being open, lubricant may be furnished the ram and the eccentric through a closure cap 84 at the upper end of the tool body 24. This cap may be provided with an oiling fixture 85 as shown. The cap 84 is recessed on its underside to provide a lubricant holding chamber above the ram.

As shown in Fig. 7, the goose-neck 42 is no wider than the cutting edges of the tool. This enables the nibbler head to be removed from the slot in the work at any point in the length of the slot. The goose-neck is tapered rearwardly at its sides as at 86, 86 to provide clearance for turning the tool in following a curved pattern line. The side surfaces of the cutting plunger are similarly tapered as at 87, 87.

I have shown in Figs. 8 and 9 the manner in which the cutting edge 67 on the plunger 38 is reground or sharpened. This is accomplished by the use of a rotary grinding wheel having a diameter sufficient to fit within the relief section 68 of the plunger 38 as shown in Fig. 8. In this figure and also in Fig. 9 the grinding wheel is marked A. This wheel is mounted on a spindle and when inserted into a chuck of a high speed power driven electric tool, such as a drill, the wheel may be rotated to regrind or sharpen the cutting edge 67. This edge extends from one side of the relief 68 to the other and is provided intermediate its ends with an arcuate section B leaving relatively straight portions C, C at the opposite sides of the plunger. This gives the plunger a punch action at the straight or flat portions C, C and a shearing action along the curved section B. The cutting edge 67 is along the outer margin of a backward slope at the base of the relief 68 as shown at 67a in Fig. 2a and hence may be kept sharp by regrinding when desired. With the relief 68 sloping backwardly as heretofore described, the grinding wheel when inserted into the space provided by the relief may be tilted to take the angle of the slope at the cutting edge 67 and thus resharpen it. The radius of the grinding wheel when employed conforms to the curved section B of the cutting edge as shown in Figs. 8 and 9. Moreover, the vertical height of the relief 68 is slightly greater than the diameter of the grinding wheel so that the latter may be inserted into the relief space 68 and be brought down into the arc B for re-sharpening this section of the cutting edge 67. Thereafter the wheel may be adjusted to the ends of the cutting edge to resharpen its straight portions C, C as indicated by the dotted lines in Fig. 9.

The nibbling tool shown and described is compact in construction. It is sufficiently rigid and strong to withstand the strains to which it is subjected when in use. It operates with very short, rapid strokes thus enabling a continuous slot to be cut into the material being operated on to the width of the cutting plunger 38 at its cutting edge 67. The tool is also comprised of a relatively few number of parts and may be easily assembled and disassembled for inspection and repair. The driving mechanism between the eccentric 32 on the shaft 14 and the ram 26 is of a character producing a positive action with no loosely connected parts to set up vibration or excessive wear. The side members 55, 56 are secured to the interposed goose-neck section 44 by cross-pins 88, 88 driven into registering openings in the parts as shown in Figs. 2 and 3.

The rotative adjustment provided for the nibbler head 35 is permissive, that is, it allows the head to be adjusted whenever desired. This is accomplished by removing the screws 39 from the tool body 2 and then turning or rotating the head 35 about the axis of the cutting plunger to the angular position desired whereupon the screws 39 are inserted into the tapped holes in the tool body at the adjustment selected. The tool may be made to be driven by a fluid actuated rotary motor, instead of an electric motor, if desired.

The details of construction and arrangement of parts shown and described may be variously changed and modified without departing from the spirit and scope of my invention except as pointed out in the annexed claims.

I claim as my invention:

1. A portable motor driven nibbler of the character described, comprising in combination, connected body and head sections, a reciprocable ram located within the body section, means carried by the body section for reciprocating the ram, a plunger reciprocated by the ram and having a portion within the body section and a portion within the head section, said plunger being connected with the ram within the body section and having a cutting edge and a relief section therefor on the front side of the plunger within the head section, said head section having a bore providing a guide-way to reciprocably mount the plunger within the head section, the latter carrying a cutting edge for cooperation with the cutting edge on the plunger, a goose-neck work support constituting a part of the head section and extending about and providing a guide for the outer end portion of the plunger, said goose-neck having front and rear portions in engagement with the front and rear sides, respectively, of the plunger, the front portion of the goose-neck terminating in spaced relation to the cutting edge on the head section to provide a work receiving mouth opening leading to the plunger at said cutting edges, and a headed screw stripper element carried by the front portion of the goose-neck in parallel relation to the plunger, said screw element having its upper end extendible into said mouth opening to vary the depth thereof and its headed end at the lower end of the goose-neck in a recess therein, said recess serving to accommodate the headed end of the screw element in substantially all positions of the endwise adjustment thereof.

2. A portable motor driven nibbler of the character described, comprising in combination, a head section having a bore providing a guide-way extending lengthwise of the head section and opening through the front side thereof, a plunger reciprocably mounted in said guide-way, means for reciprocating the plunger, said plunger having a cutting edge adjacent to its outer end on the side of the plunger at the open side of the guide-way, a blade element secured to the head section over the guide-way and completing the front side of the same, said blade element having a cutting edge at the guide-way for cooperation with the cutting edge on the plunger, means for releasably securing the blade element to the head section, and a goose-neck work support carried by the head section and extending across the outer end of the plunger and along the front and rear sides thereof, the front portion of the goose-neck terminating in sapced relation to the blade element to provide a work receiving mouth opening leading to the plunger at said cutting edges.

3. A portable motor driven nibbler of the character described, comprising in combination, a head section having a bore providing a guide-way extending lengthwise of the head section and opening through the front side thereof, a plunger reciprocably mounted in said guide-way, means for reciprocating the plunger, said plunger having a cutting edge adjacent to its outer end on the front side of the plunger at the open side of the guide-way, a blade element releasably secured to the head section over the guide-way for closing the same above the cutting edge of the plunger, said blade element being similarly milled on its front and rear faces commensurate with the width of the guide-way to complete the front side thereof when either side of the blade element is secured to the head section over the guide-way, said blade element having a cutting edge at the lower end of each of its milled portions whereby either cutting edge may be used with the cutting edge of the plunger on reversing the blade element, and a goose-neck work support carried by the head section and having front and rear portions on the corresponding sides of the plunger and engaging the same and a cross-section beyond the outer end of the plunger, the front portion of the goose-neck terminating in spaced relation to the blade element to provide a work receiving mouth opening leading to the plunger at said cutting edges.

4. A portable motor driven nibbler of the character described, comprising in combination, connected body and head sections, a reciprocable ram located within a cylindrical chamber in the body section, means carried by the body section for reciprocating the ram, a plunger reciprocated by the ram and having a portion within the body section and a portion within the head section, said head section and said plunger having cooperating cutting edges on the front side of the plunger, said head section having a bore providing a guide-way to reciprocably mount the plunger within the head section, a goose-neck work support carried by the head section and extending beyond and about the outer end portion of the plunger and along the front and rear sides thereof, the front portion of the goose-neck terminating in spaced relation to the cutting edge on the head section to provide a work receiving mouth opening leading to the plunger at said cutting edges, means connecting the plunger to the ram within said chamber, said means being constructed and arranged to provide for axial adjustment of the plunger for setting its cutting edge in operative relation to the cutting edge on the head section, and a removable closure for the chamber at the end of the body section to provide for access to the adjusting means for the plunger.

5. A portable motor driven nibbler of the character described, comprising in combination, connected body and head sections, a reciprocable ram located within the body section, means carried by the body section for reciprocating the ram, a plunger reciprocated by the ram and having a portion within the body section and a portion within the head section, means providing cooperating cutting edges on the plunger and the head section, respectively, on the front side of the plunger, a goose-neck work support carried by the head section and extending beyond and about the outer end portion of the plunger and along the front and rear portions thereof, said goose-neck having its front portion terminating in spaced relation to the cutting edge on the head section to provide a work receiving mouth opening leading to the plunger at said cutting edges, and means connecting the plunger to the ram including a screw plug arrangement engaged with threads within a bore in the ram for adjusting the plunger axially of the ram.

6. A portable motor driven nibbler of the character described, comprising in combination, connected body and head sections, a reciprocable ram located within the body section, means carried by the body section for reciprocating the ram, a plunger reciprocated by the ram and having a portion within the body section and a portion within the head section, means providing cooperating cutting edges on the plunger and the head section, respectively, on the front side of the plunger, a goose-neck work support carried by the head section and extending beyond and about the outer end portion of the plunger and along the front and rear sides thereof, said goose-neck having its front portion terminating in spaced relation to the cutting edge on the head section to provide a work receiving mouth opening leading to the plunger at said cutting edges, means connecting the plunger to the ram including a screw plug engaged with screw threads within a bore in the ram for adjusting the plunger axially of the ram, and a second screw plug engaged with the threads in said bore above the plunger and accessible through the upper end of the bore for locking the plunger within the ram in any of its positions of axial adjustment.

7. A portable motor driven nibbler of the character described, comprising in combination, a head section consisting of a goose-neck work support and side members secured to the goose-neck on opposite sides thereof, said side members projecting forwardly of the goose-neck to provide in connection therewith a guide-groove opening through the front side of the head section, a plunger reciprocably mounted in said guide-groove, means for reciprocating the plunger, and a blade element secured to said side portions over the guide-groove and providing the front wall thereof, said blade element having a cutting edge at its lower end, said plunger having a cutting edge adjacent to its lower end and cooperating with the cutting edge on the blade element, and said goose-neck extending beyond and about the outer end of the plunger to guide the same and terminating in spaced relation to the blade element to provide a work receiving mouth opening leading to the plunger at said cutting edges.

8. A portable motor driven nibbler of the character described, comprising in combination, a head section consisting of laterally spaced side members to provide a guide-way therebetween, a top portion connecting said side members and overhanging the front sides thereof, a goose-neck work support secured to the side members in the space between them and forming the rear wall of said guideway, a plunger reciprocably mounted in said guide-way and having its rear and its side surfaces in sliding engagement with the goose-neck and the side members, respectively, a blade element secured to the side members beneath said top portion and fitting over the guide-way to close the same, said plunger having a cutting edge adjacent to its lower end, said blade element having a cutting edge cooperating with the cutting edge on the plunger, said goose-neck extending beyond the outer end portion of the plunger and engaging the front and the rear sides thereof to support the outer end of the plunger, the front portion of the goose-neck terminating in spaced relation to the blade element to provide a work receiving mouth opening leading to the plunger at said cutting edges, and means for reciprocating the plunger.

9. A portable motor driven nibbler of the character described, comprising in combination, a head section having a bore providing a guide-way extending lengthwise of the head section and opening through the front side thereof, a plunger reciprocably but non-rotatably mounted in said guide-way, means for reciprocating the plunger, said plunger having a cutting edge and a relief section therefor adjacent to its lower end on the front side of the plunger and facing the open side of the guide-way, a blade element secured to the head section over the guide-way and closing the same above the cutting edge on the plunger, said blade element having a cutting edge at its lower edge for cooperation with the cutting edge of the plunger, means providing a discharge opening through the blade element from the relief section of the plunger for the cuttings removed by the plunger in a cutting operation thereof, and a work support carried by the head section and projecting beyond and about the lower end of the plunger to guide the same, said work support having a portion on the front side of the plunger and terminating in spaced relation to the blade element to provide a work receiving mouth opening leading to the plunger at said cutting edges.

10. A portable motor driven nibbler of the character described, comprising in combination, a head section having a bore providing a guide-way extending lengthwise of the head section and opening through the front side thereof, a plunger reciprocably but non-rotatably mounted in said guide-way, means for reciprocating the plunger, said plunger having a cutting edge and a relief section therefor adjacent to its lower end on the front side of the plunger at the open side of the guide-way, a blade element detachably secured to the head section over the guide-way and closing the same above the cutting edge of the plunger, said blade element having a cutting edge for cooperation with the cutting edge on the plunger, means providing a discharge opening through the blade element from the relief section of the plunger in substantially right-angular relation thereto for the cuttings removed by the plunger in the cutting operation thereof, said relief section being backwardly inclined from the cutting edge of the plunger in the direction of the discharge opening to widen the passageway for the cuttings to said discharge opening in the blade element, and a work support carried by the head section and projecting beyond and about the lower end of the plunger to guide the same, said work support terminating in spaced relation to the blade element to provide a work receiving mouth opening leading to the plunger at said cutting edges.

11. A portable motor driven nibbler of the character described, comprising in combination, a head section having a bore providing a guide-way extending lengthwise of the head section and opening through the front side thereof, a plunger reciprocably but non-rotatably mounted in said guide-way, means for reciprocating the plunger, said plunger having a cutting edge and a relief section therefor adjacent to its lower end on the front side of the plunger at the open side of the guide-way, a blade element secured to the head section over the guide-way and closing the same above the cutting edge of the plunger, said blade element having a cutting edge cooperating with the cutting edge on the plunger, means providing a discharge opening through the blade element from the relief section of the plunger for the cuttings removed by the plunger in the cutting operation thereof, a projection for the blade element below the discharge opening therein to deflect the cuttings to at least one side of the plunger, said deflector being in normal relation to the plunger and extending directly in front of the same to provide a guide for the plunger in cutting along a defined path, and a work support carried by the head section and projecting beyond and about the lower end of the plunger to guide the same, said work support terminating in spaced relation to the blade element to provide a work receiving mouth opening leading to the plunger at said cutting edges.

12. A portable motor driven nibbler of the character described, comprising in combination, a head section having a bore providing a guide-way extending lengthwise the head section and opening through the front side thereof, a plunger reciprocably but non-rotatably mounted in said guide-way, means for reciprocating the plunger, said plunger having a cutting edge and a relief section therefor adjacent to its lower end on the front side of the plunger at the open side of the guide-way, a blade and a plate element secured to the head section over the guide-way with the blade element closing the guide-way above the cutting edge of the plunger and the plate element on the outer side of the blade element, said blade element having a cutting edge cooperating with the cutting edge on the plunger, registering openings in the blade and the plate elements from the relief section of the plunger for the discharge of cuttings removed by the plunger in the cutting operation thereof, a projection on the plate element below said discharge openings and extending outwardly therefrom to provide a guide for the plunger in a cutting operation, said projection having an appreciable width to deflect the cuttings to either side of the plunger, and a work support carried by the head section and projecting beyond and about the lower end of the plunger to guide the same, said work support terminating in spaced relation to the blade element to provide a work receiving mouth opening leading to the plunger at said cutting edges.

13. A portable motor driven nibbler of the character described, comprising in combination, a head section having a bore providing a guide-way extending lengthwise of the head section, a plunger reciprocably but non-rotatably mounted in said guide-way, cooperating cutting edges and a relief portion therefor on the plunger and the head section, respectively, said cutting edges extending cross-wise of the plunger and one of said cutting edges having a curved section to provide a shearing cut for the plunger and a substantially straight portion to provide a punching action for the plunger at one end of said curved section, a discharge opening in the head section from the relief section for the cuttings removed by the plunger, means for reciprocating the plunger, and a work support carried by the head section and projecting beyond and about the lower end of the plunger to guide the same, said work support terminating in spaced relation to the cutting edge on the head section to provide a work receiving mouth opening leading to the plunger.

14. A portable motor driven nibbler of the character described, comprising in combination, connectable body and head sections, a reciprocable ram located within the body section, means carried by the body section for reciprocating the ram, a plunger reciprocated by the ram and having a portion within the body section and a portion within the head section, said plunger having a swivel connection with the ram within the body section and a cutting edge and a relief section therefor on its front side within the head section, said head section having a bore providing a guide-way to slidably and non-rotatably mount the plunger within the head section, means providing a fixed cutting edge on the body section for cooperation with the cutting edge on the plunger, a goose-neck work support constituting a part of the head section and extending about and providing a guide for the outer end portion of the plunger, said goose-neck having a front portion on the front side of the plunger and terminating in spaced relation to the cutting edge on the head section to provide a work receiving mouth opening leading to the plunger at said cutting edges, said body and head sections having engageable annular surfaces about the plunger to provide a seat for the head section on the body section in substantially right-angular relation to the plunger whereby the head section and the plunger may be turned in unison for angular adjustment about the axis of the plunger, and screw elements securing the head and the body sections together through the engageable annular surfaces thereof.

15. A portable motor driven tool of the character described, comprising in combination, connectable body and head sections, reciprocable ram and plunger elements slidably mounted within the body and the head sections, respectively, means carried by the body section for reciprocating the ram, said plunger having a swivel connection with the ram and having a cutting edge on its front side within the head section, means providing a fixed cutting edge on the body section for cooperation with the cutting edge on the plunger, a work support for the plunger on the head section and having a portion terminating in spaced relation to the cutting edge on the head section to provide a work receiving mouth opening leading to the plunger at said cutting edges, said body and head section having engageable annular surfaces about the plunger to provide a seat for the head section on the body section in substantially right-angular relation to the plunger whereby the head section and the plunger may be turned in unison for angular adjustment about the axis of the plunger, and screw elements securing the head and the body sections together through the engageable annular surfaces thereof.

16. A portable motor driven nibbler of the character described, comprising in combination, a head section having a bore providing a guide-way extending lengthwise thereof, a plunger reciprocably but non-rotatably mounted in said guide-way, cooperating cutting edges and a relief portion therefor carried by the plunger and the head section, respectively, said cutting edges extending cross-wise of the plunger, one of said cutting edges having a curved section to provide a shearing cut for the plunger and a substantially straight portion to provide a punching action for the plunger at one end of said curved section, a discharge opening for the relief section for the cuttings removed by the plunger, means for reciprocating the plunger, and a work support carried by the head section and projecting beyond the plunger below the cutting edge thereon, said work support terminating in spaced relation to the head section at said cutting edges to provide a work receiving mouth opening leading thereto.

17. A portable motor driven nibbler of the character described, comprising in combination, a head section having a bore providing a guide-way extending lengthwise thereof, a plunger reciprocably but non-rotatably mounted in said guide-way, cooperating cutting edges and a relief portion therefor carried by the plunger and the head section, respectively, said cutting edges extending crosswise of the plunger, the cutting edge on the plunger being at the outer margin of a backward slope on the plunger at the base of the relief portion and having a curved section to provide a shearing cut for the plunger and a substantially straight portion to provide a punching action for the plunger at one end of said curved section, a discharge opening for the relief portion for the cuttings removed by the plunger, means for reciprocating the plunger, and a work support carried by the head section and projecting beyond the plunger below the cutting edge thereon, said work support terminating in spaced relation to the head section at said cutting edges to provide a work receiving mouth opening leading thereto.

FRITHIOF P. FORSS.